US005214728A

United States Patent [19]

Shigematsu et al.

[11] Patent Number: 5,214,728

[45] Date of Patent: May 25, 1993

[54] LIGHT COMMUNICATION SYSTEM

[75] Inventors: Masayuki Shigematsu; Kohji Nakazato, both of Kanagawa; Izumi Sankawa, Ibaraki, all of Japan

[73] Assignees: Sumitomo Electric Industries, Ltd., Osaka; Nippon Telegraph and Telephone Corp., Tokyo, both of Japan

[21] Appl. No.: 888,474

[22] Filed: May 22, 1992

Related U.S. Application Data

[63] Continuation of Ser. No. 717,208, Jun. 19, 1991, abandoned.

[30] Foreign Application Priority Data

Jun. 19, 1990 [JP] Japan ................................ 2-161077

[51] Int. Cl.[5] ................................................ G02B 6/00

[52] U.S. Cl. ...................................... 385/24; 359/152

[58] Field of Search ..................... 350/96.16; 455/602, 455/605, 606, 607, 610

[56] References Cited

U.S. PATENT DOCUMENTS 4,781,427 11/1988 Husbands et al. ................ 350/96.16
4,878,726 11/1989 Fatehi .............................. 350/96.16
4,889,404 12/1989 Bhagavatula et al. ........... 350/96.16
4,933,990 6/1990 Mochizuki et al. .......... 350/96.16 X

FOREIGN PATENT DOCUMENTS 59-91745 9/1984 Japan .
63-98231 9/1988 Japan .
1-115230 8/1989 Japan .

OTHER PUBLICATIONS

K. Hagimoto et al, PD 15, Optical Fiber Communicaton Conference, '89.

K. Kikushima et al, PD 22, Optical Fiber Communication Conference '90.

*Primary Examiner*—Akm E. Ullah

*Attorney, Agent, or Firm*—Cushman, Darby & Cushman

[57] ABSTRACT

A bi-directional optical communication system. A first optical fiber includes a plurality of pieces, each piece having a first and second end. An optical amplifier for amplifying optical signals transmitted in a first direction is coupled to first and second pieces of the first optical fiber. A second optical fiber is coupled to the first and second pieces, bypasses the optical amplifier and transmits optical signals in a second direction opposite to the first direction. A first optical signal generator apparatus coupled to the first piece of the first optical fiber provides optical signals propagating in the first direction to a optical receiver apparatus coupled to the second piece of the first optical fiber. A second optical signal generator in the optical receiver apparatus provides optical signals propagating in the second direction to the first optical signal generator apparatus. A second optical receiver and a monitor, both in the first optical signal generator apparatus, receive the optical signals propagating in the second direction and monitor various operating conditions of the optical communication system.

15 Claims, 5 Drawing Sheets

LIGHT COMMUNICATION SYSTEM

This is a continuation of application Ser. No. 07/717,208, filed on Jun. 19, 1991, which was abandoned upon the filing hereof.

BACKGROUND OF THE INVENTION

1. Field of the Invention

The present invention relates to optical communication systems. In particular, the present invention provides a novel configuration of optical communication systems comprising an optical transmission line consisting of optical fibers, and optical fiber amplifiers.

2. Description of Related Art

Optical communication systems using an optical fiber as a signal transmission line have been developed. These systems benefit from the low loss and wide band properties of the optical fiber. Therefore, with regard to the use of optical fibers in optical communication systems, various technologies and applications such as coherent light transmission systems, intensity-modulation/direct-detection systems, etc., have been studied.

One technology recently being studied is an optical fiber amplifier which uses an amplification effect of an Er-added (Erbium added) optical fiber or the like. An Er-added optical fiber is fabricated by doping a conventional optical fiber material with the rare earth element of Erbium. Such an optical fiber amplifier has a number of features such as high gain, low insertion loss, no polarization dependence, low noise, and high saturation output, etc. A successful non-repeating transmission experiment conducted on this type of amplifier resulted in a bit rate of 1.8Gb/sec for a distance of 212 km (The Institute of Electronics, Information and Communication Engineers of Japan, Light Communication System Study Society OCS 89-3 (K. Hagimoto, et al., PD 15, Optical Fiber Communication Conference '89)). In addition, using the amplifier in cooperation with an optical transmission line in a system having multiple independent receivers (i.e. cable TV subscribers) has been considered (The Institute of Television Engineering of Japan, Technical Report 1989 (K. Kikushima, et al., PD 22, Optical Fiber communication Conference '90)). In general, the development of optical fiber amplifiers is expected to contribute greatly to the improvement of future optical communication systems.

FIG. 4 (Prior Art) is a schematic diagram of a basic configuration of an optical fiber amplifier using an Er-added optical fiber.

The optical fiber amplifier 210 (surrounded by the dotted line in FIG. 4) comprises an optical fiber 31 having an input terminal connected to an optical transmitter 200, an optical fiber 32 having an output terminal connected to an optical receiver 202, and an Er-added optical fiber 35 coupled between the optical fibers 31 and 32 through optical isolators 33 and 34. An pumping light source 36 is coupled with the Er-added optical fiber 35 through a multiplexing photo-coupler 36*a*. In order to eliminate pumping light and ASE (Amplified Spontaneous Emission) from an optical transmission line, a filter 35*a* is inserted between the optical isolator 34 and optical fiber 32.

Optical isolators 33 and 34 are non-reciprocal optical elements which transmit light in one direction only. The optical isolators 33 and 34 suppress the laser oscillation of the Er-added optical fiber 35. Therefore, in this system, all light signals are prevented from propagating to the transmitter from the receiver by the optical isolator 33 or 34.

However, in a practical operation of the optical communication system, it may be necessary to perform bi-directional optical signal transmission through a single optical fiber line, or to monitor the conditions of an optical transmission line by use of an optical time domain reflectometer (OTDR). By monitoring Rayleigh back scattering light produced in the optical fiber at one terminal portion of the optical fiber, the OTDR can detect various defective conditions (i.e. disconnections) which may occur at any portion of the optical fiber.

FIG. 5 (Prior Art) is a schematic diagram of an example of an optical communication system using an optical fiber amplifier comprising an Er-added fiber. An optical signal is transmitted from a center office 400 via an optical fiber amplifier 410 to a subscriber 420.

An OTDR 41 and an optical transmitter 42 are provided in the center office 400. The OTDR 41 and the optical transmitter 42 are connected to an optical fiber 44 through a common multiplexing photo-coupler 43. The optical fiber 44 acts as a transmission line and is connected to an Er-added optical fiber 46 through an optical isolator 45, and the end terminal of the Er-added optical fiber 46 is connected to an input port of a star coupler 48 through an optical isolator 47. An output port of the star coupler 48 is connected to a plurality of optical fibers 49*a* which are each connected to a receiver 49. In practice, the optical isolator 45 is connected to the Er-added optical fiber 46 through a multiplexing photo-coupler 46*a* which is adapted to inject pumping laser light provided by a semiconductor laser 46*b* to the Er-added optical fiber 46. In addition, a filter 46*c* is inserted after the optical isolator 47 and the star coupler 48.

An optical signal transmitted from the center office 400, for example, in the 1.55 $\mu$m band, is amplified by the Er-added optical fiber 46 excited by a semiconductor laser of the 1.48 $\mu$m band, and then propagates to the each receiver 49 through the star coupler 48 and optical fiber 49*a*. Then, by using the OTDR 41 mounted with a semiconductor laser, for example, of the 1.31 $\mu$m band range, it is possible to monitor the conditions of the optical fiber 44 at the center office 400.

However, in this optical communication system, since the optical isolators are inserted to the optical transmission line constituted by the optical fiber 44, the Er-added optical fiber 46 and the star coupler 48, it is impossible to transmit a optical signal from a receiver 49 to the center office 400. In addition, in the same manner, the region capable of being monitored by the OTDR 41 is limited to the section A from the center office 400 to the optical isolator 45.

SUMMARY OF THE INVENTION

It is therefore an object of the present invention to provide an optical fiber communication system having an optical fiber amplifier and permitting bi-directional optical signal transmission between a transmitter and a receiver. It is an additional object of the present invention to enable conditions of optical fibers throughout the entire optical communication system to be monitored at a center office.

To achieve the above objectives, a novel configuration of an optical communication system is proposed which comprises an optical fiber line coupled to an optical fiber amplifier such as an Er-added optical fiber or the like, and an optical transmission line to by-pass the optical fiber amplifier to provide bi-directional transmission and to allow back scattering light to propagate towards a transmitter.

The optical communication system uses the optical fiber as a optical signal transmission line. The optical fiber line includes a two-piece trunk line optical fiber with each piece having first and second terminals. One terminal of the first piece is coupled to a center office. The optical fiber amplifier has first and second terminals with an optical isolator coupled to each terminal. The second terminal of the first piece of the trunk line optical fiber is coupled to the optical isolator coupled to the first terminal of the optical fiber amplifier and the first terminal of the second piece of the trunk line optical fiber is coupled to the optical isolator coupled to the second terminal of the optical fiber amplifier.

The optical communication system further comprises subscriber optical fibers. Each subscriber optical fiber has a start terminal coupled with the second terminal of the second piece of the trunk line optical fiber and an end terminal coupled with a respective receiver.

The by-pass optical transmission line constitutes an optical fiber having first and second terminals. The first terminal of the bypass optical transmission line optical fiber is coupled to both the first piece of the trunk line optical fiber and the optical isolator coupled to the first terminal of the optical fiber amplifier through a first multiplexing/demultiplexing photocoupler. The second terminal of the by-pass light transmission line optical fiber is coupled to both the second piece of the trunk line optical fiber and the optical isolator coupled to the second terminal of the optical fiber amplifier through a second multiplexing/demultiplexing photo-coupler.

The main feature of the optical communication system according to the present invention is that the by-pass optical transmission line is in parallel to the optical fiber amplifier and thus permits optical signals to propagate from the subscriber back to the center office.

In a conventional optical fiber line using an optical fiber amplifier, optical isolators which are non-reciprocal elements have been used to prevent oscillation in the optical fiber amplifier. Therefore, optical signals are prevented from propagating in a direction other than a predetermined transmission direction. However, in practice, it may be necessary to transmit signals from the subscriber to the center office or to monitor the condition of the entire optical transmission line. In these cases, it is impossible to use an optical transmission line using an optical fiber amplifier.

In the optical communication system according to the present invention, an optical fiber line bypasses the optical fiber amplifier and the optical isolators disposed at both ends of the optical fiber amplifier. Therefore, an optical signal propagating from the subscriber to the center office travels through this by-pass optical fiber line. In this system, bi-directional optical signal communication is possible and the OTDR is available to monitor the entire optical fiber line. Furthermore, since bi-directional signal transmission can be made, it is possible to detect signal line faults on individual subscriber signal lines branched by a star coupler or the like. To perform this function, predetermined addresses are assigned to each respective receivers in advance and a call signal is added to a portion of an optical signal transmitted from the center office. Therefore, it is possible to detect when a call signal is issued to the subscribers successfully and if any subscriber has generated no response to the call signal, faults is presumed to exist in the optical fiber line of the subscriber that has not generated a response.

In addition, if the pumping light is supplied from the center office by using another optical fiber, it is also possible to monitor the operation conditions of the optical fiber amplifier through this independent optical fiber for pumping. That is, a branching coupler is inserted after the second terminal of the optical fiber amplifier to tap an amplified signal and to return the tapping signal to the center office through the above-mentioned independent optical fiber. Therefore, it is possible to monitor the operation conditions of both the optical fiber amplifier and an optical fiber line used for communication. This optical fiber amplifier monitoring can be used not only to detect faults with the optical fiber amplifier but also to stabilize the signal quality or signal level propagating to a subscriber.

In addition, according to the above-mentioned configuration of the optical communication system of the present invention, since the optical fiber line and optical fiber amplifier are made up of passive elements, the system is easily built and maintained and is highly reliable.

Although the present invention will be described below in detail with reference to the drawings, the disclosure is not meant to limit the technical scope of the present invention but merely provides exemplary embodiments of the present invention.

BRIEF DESCRIPTION OF THE DRAWINGS

FIG. 1(*b*) is a schematic diagram of another embodiment of the optical communication system shown in FIG. 1(*a*);

FIG. 3(*b*) is a schematic diagram explaining the function of optical circulator used in the optical communication system shown in FIG. 3(*a*);

DETAILED DESCRIPTION OF THE PREFERRED EMBODIMENTS

Figure 1A:
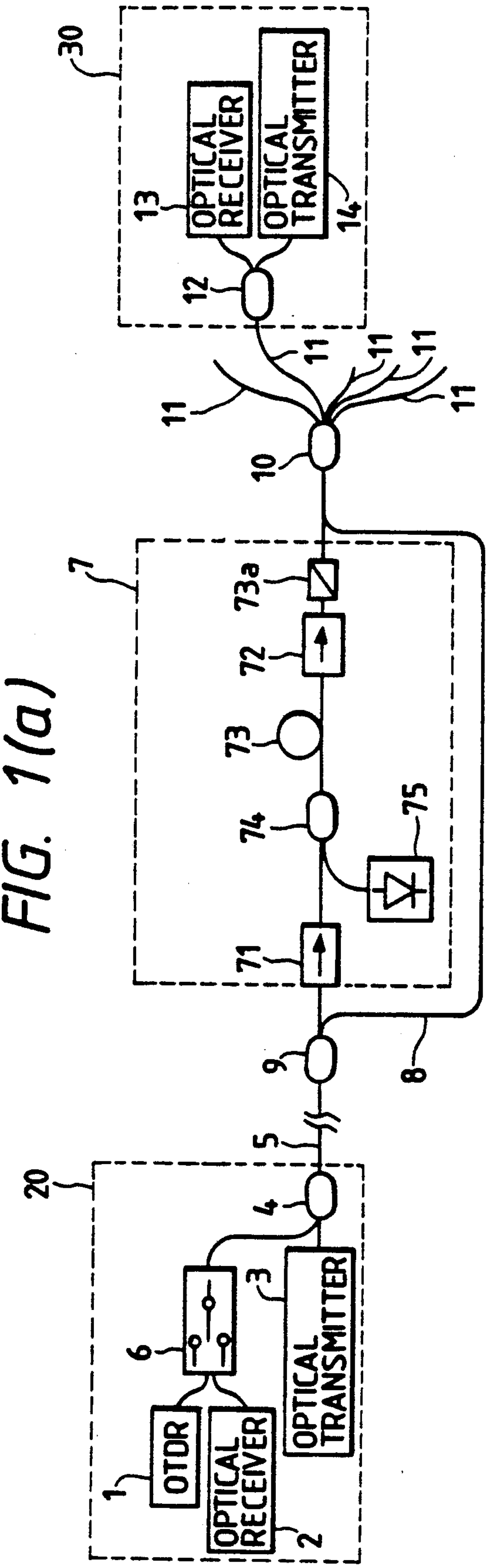
FIG. 1(*a*) is a schematic diagram of an example of a basic configuration of the optical communication system according to the present invention.
Figure 1B:
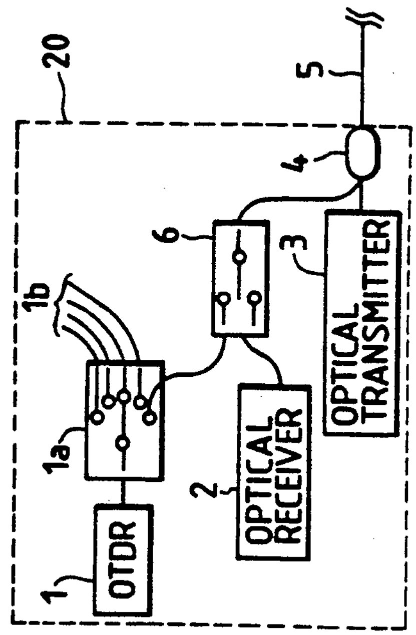

FIG. 1(*a*) is a schematic diagram of the basic configuration of the optical communication system according to the present invention.

As shown in FIG. 1(*a*), this optical communication system includes an OTDR 1, an optical receiver 2 and an optical transmitter 3 collectively grouped as a center office 20. The optical transmitter 3 is further coupled to a multiplexing/demultiplexing photo-coupler 4. The OTDR 1 and the optical receiver 2 are selectively coupled to the multiplexing/demultiplexing photo-coupler 4 through the optical switch 6. A trunk line optical fiber 5 has first and second pieces, each having first and second terminals, and the multiplexing/demultiplexing photo-coupler 4 is coupled to the first terminal of the first piece of the trunk optical fiber 5.

An optical fiber amplifier 7 comprises an Er-added optical fiber 73 having first and second terminals. Optical isolators 71 and 72 are coupled to the first terminal and second terminal of Er-added optical fiber 73, respectively. A semiconductor laser 75, coupled to the Er-added optical fiber 73 through a multiplexing photocoupler 74, injects pumping light into the Er-added optical fiber 73.

The optical isolator 71 is coupled to the second terminal of the first piece of the trunk line optical fiber 5. A filter 73*a* is coupled to the optical isolator 72 and first terminal of the second piece of the trunk line optical fiber 5.

By-pass optical fiber 8 has first and second terminals and multiplexing/demultiplexing photo-coupler 9 couples the first terminal of by-pass optical fiber 8 to the second terminal of the first piece of trunk line optical fiber 5 and the optical isolator 71.

Optical fibers for subscriber 11 each comprise first and second terminals. A first terminal of each optical fiber 11 is coupled to the second terminal of the second piece of the trunk line optical fiber 5 and to the second terminal of bypass optical fiber 8 through a star coupler 10. Optical receivers 13 and optical transmitters 14 are provided for each subscriber 30 such that one optical receiver 13 and one optical transmitter 14 are coupled through a multiplexing/demultiplexing photo-coupler 12 to a second terminal of each optical fiber 11. Preferably, as for the star coupler 10, for the star coupler, the branching ratio has low dependency on wavelength.

In the optical communication system having the configuration described above, generally, the optical switch 6 is switched to permit signal transmission from the optical transmitter 3. A optical signal, for example, may have a wavelength of 1.55 μm. An optical signal sent out from the optical transmitter 3 propagates to a subscriber 30 through the multiplexing/demultiplexing photo-coupler 4, the trunk line optical fiber 5, the optical fiber amplifier 7, the star coupler 10 and the receiver station optical fiber for subscribers 11. In the subscriber 30, this optical signal is received by an optical receiver 13 through the multiplexing/demultiplexing photo-coupler 12.

In this optical communication system, it is also possible to perform signal transmission from the subscriber 30 to the center office 20. For example, an optical signal having a wavelength of 1.31 μm can be transmitted from the optical transmitter 14 of the subscriber 30 to the center office 20 through the optical fiber for subscriber 11, the star coupler 10, the by-pass optical fiber 8, the multiplexing photo-coupler 9, the trunk line optical fiber 5 and the multiplexing/demultiplexing photo-coupler 4. At the center office 20, this optical signal is received by the optical receiver 2.

To monitor the conditions of the trunk line optical fiber 5 in this optical communication system, the optical switch 6 is switched to the OTDR 1.

As has been described, in this optical communication system, since the by-pass optical fiber 8 bypasses the optical fiber amplifier 7, bi-directional optical signal transmission between the center office 20 and the subscriber 30 can be performed. Since the second terminal of the by-pass optical fiber 8 is coupled to the star coupler 10, a by-pass optical fiber line is formed without using another optical fiber cable.

FIG. 1(*b*) is a schematic diagram of an alternative embodiment of center office 20. Parts being the same as those in FIG. 1(*a*) are referenced correspondingly.

In this embodiment, the OTDR 1 is coupled to the optical switch 6 through a selection optical switch 1*a*. The selection optical switch 1*a* selectively couples OTDR 1 to the optical switch 6 and to terminals 1*b*. Therefore, the OTDR 1 can be connected to the optical switch by the selection optical switch la only when the OTDR 1 is used by the optical communication system shown in FIG. 1(*a*). Otherwise, by switching the selection optical switch la, the OTDR 1 can be used by other equipment (not shown) connected to the selection light switch 1*a* at terminals 1*b*.

Figure 2:
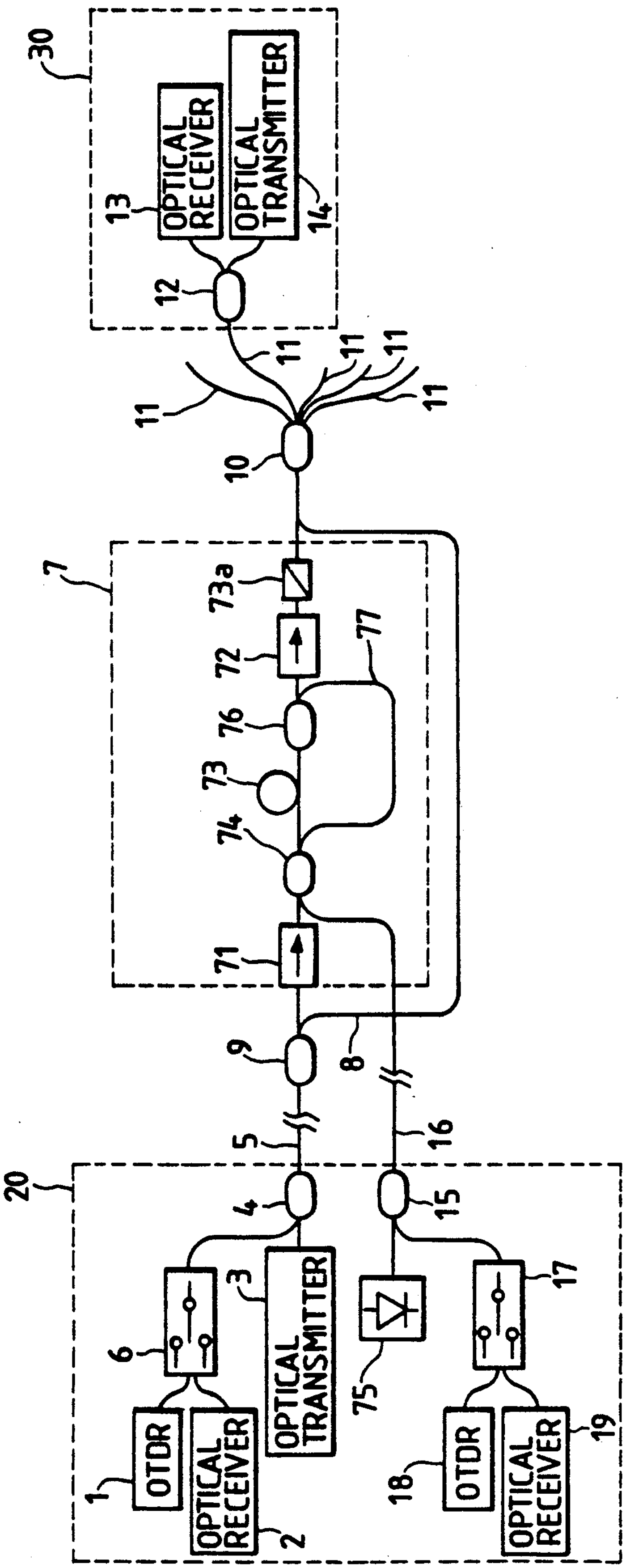
FIG. 2 is a schematic diagram of a further embodiment of the optical communication system according to the present invention.

FIG. 2 is a schematic diagram of an alternative embodiment of a high-functional optical communication system according to the invention. Parts being the same as those in the optical communication system shown in FIG. 1(*a*) are referenced correspondingly.

Pumping light for the optical fiber amplifier 7 is supplied from the center office 20 and thus the operating conditions of the optical fiber amplifier 7 can be monitored from the center office 20. To perform this monitoring function, in addition to OTDR 1, optical receiver 2, multiplexing/demultiplexing photo-coupler 4, optical switch 6, and optical transmitter 3, the center office 20 is provided with an OTDR 18 and a optical receiver 19 coupled to a optical switch 17, and a semiconductor laser 75 for supplying pumping light to an optical fiber amplifier 7.

Optical for supplying pumping light fiber 16 is provided having first and second terminals. The optical switch 17 and the semiconductor laser 75 are coupled to the first terminal of optical fiber 16 through multiplexing/demultiplexing photo-coupler 15. The second terminal of the optical fiber 16 is coupled to the Er-added optical fiber 73 and the optical isolator 71 by photo-coupler 74. Furthermore, tapped signal, from the output of the optical fiber amplifier by inserting a branching photo coupler 7 between the Er-added optical fiber 73 and the optical isolator 72 is coupled to branch optical fiber 77, and provided to the second terminal of the optical fiber for supplying pumping light 16 through the photo-coupler 74. This arrangement permits the tapped signal to return to the center office 20 through the optical fiber for supplying pumping light 16.

Therefore, not only can OTDR 1 monitor the conditions of the optical fiber as described for the FIG. 1(*a*) embodiment, but the FIG. 2 embodiment also enables the operation conditions, the fault production, etc. of the optical fiber amplifier 7 to be monitored at the center office 20 through the optical fiber for supplying pumping light 16 as follows.

In the optical fiber amplifier 7, a portion of an optical signal amplified by an Er-added optical fiber 73, for example, 1/100 of the optical signal, is removed by the branching photo-coupler 76 and provided to the optical fiber 16 through branch optical fiber 77 and photo-coupler 74. Therefore, by switching the optical switch 17 to access the optical receiver 19, it is possible to monitor, at the center office 20, the conditions of the optical signal which has been amplified by the optical fiber amplifier 7. If the output is decreased due to disconnection, breakage of an optical fiber, or the like in the optical fiber amplifier 7, these conditions can be detected at the center office 20. In addition, by changing a driving current for the semiconductor laser 75, the amount of pumping light provided can be controlled and therefore the receiving level of the optical receiver 19 is kept constant. This permits AGC (Automatic Gain Control) of the optical fiber amplifier 7.

A decrease in the output power of the optical fiber amplifier 7 also could be due to degradations in the semiconductor laser 75. To detect such degradations, the output power of the semiconductor laser 75 can be monitored by a photodiode included in the semiconductor laser nudule. In addition, the conditions of the optical fiber for supplying pumping light 16 can be monitored through the OTDR 18 by switching the optical switch 17 to access the OTDR 18. The operation of the optical transmitter 3 in the center office 20 also can be monitored by a photodiode disposed in the optical transmitter 3.

In addition to the above characteristics, photo-couplers 4, 9, 10, 12, 15, 74 and 76, trunk line optical fiber 5, optical fiber for supplying pumping light 16, optical isolators 71 and 72, Er-added optical fiber 73, filter 73*a*, and receiver station optical fiber for subscriber 11 are passive elements. This provides high reliability and easy maintenance because all components in the field are passive.

Conditions existent throughout the optical signal propagation paths can be monitored at the center office 20. However, if disconnections or the like occur in the receiver station optical fiber for subscriber 11 coupled to the star coupler 10, it is impossible to determine which optical fiber 11 is defective. Therefore, each subscriber 30 is given its own address in advance, and a optical signal including a call signal is transmitted from the center office 20 to each of the respective subscribers 30 sequentially. A optical transmitter 14 in each subscriber 30 transmits a predetermined signal in to call from the center office 20, and the optical receiver 2 in the center office 20 receives the predetermined signals from the subscribers 30 sequentially. Therefore, if a receiver station 30 gives no response, this indicates that the receiver station optical fiber for subscribers 11 connected to that subscribere is defective.

It is also possible to achieve a bi-directional communication with these signals and monitor the optical fiber amplifier concurrently. For example, by designating the OTDRs 1 and 18 and optical signals propagating from the subscriber 30 to the center office 20 to the 1.31 μm band wavelength, and optical signals propagating from the optical transmitter 3 of the center office 20 to the 1.55 μm band wavelength, these optical signals can be monitored and detected independent of each other.

The above wavelengths are merely examples of possible wavelengths that can be used. Furthermore, if the optical signal wavelengths used by the OTDRs and the optical signals propagating from the subscriber 30 to the center office 20 are different, it is possible to replace the optical switches provided in the center office 20 with photo-couplers. Also, the optical fiber amplifier 7 may comprise an element other than an Er-added optical fiber.

Figures 3A, 3B:
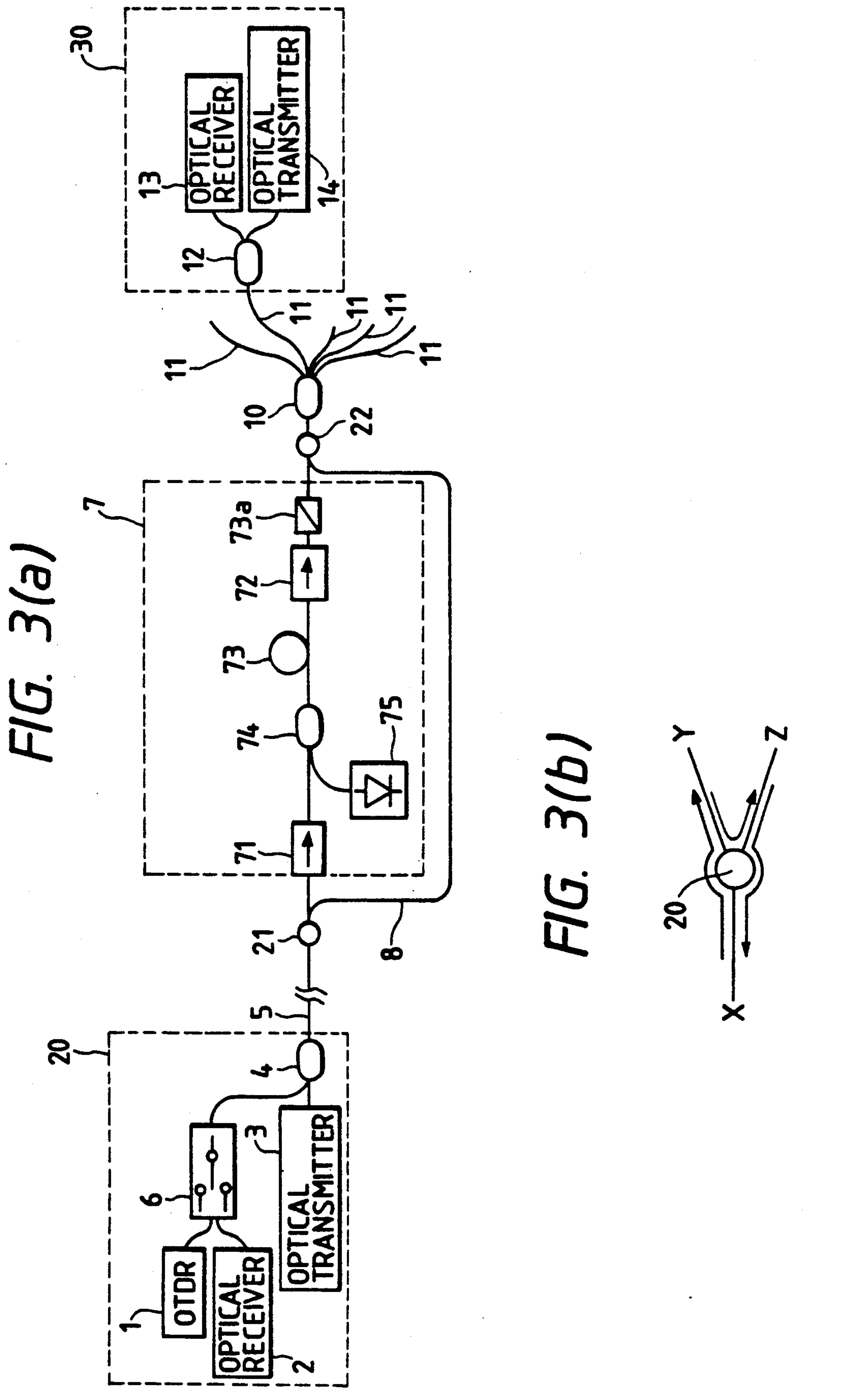
FIG. 3(*a*) is a schematic diagram of another example of the configuration of the optical communication system according to the present invention.
Figure 4:
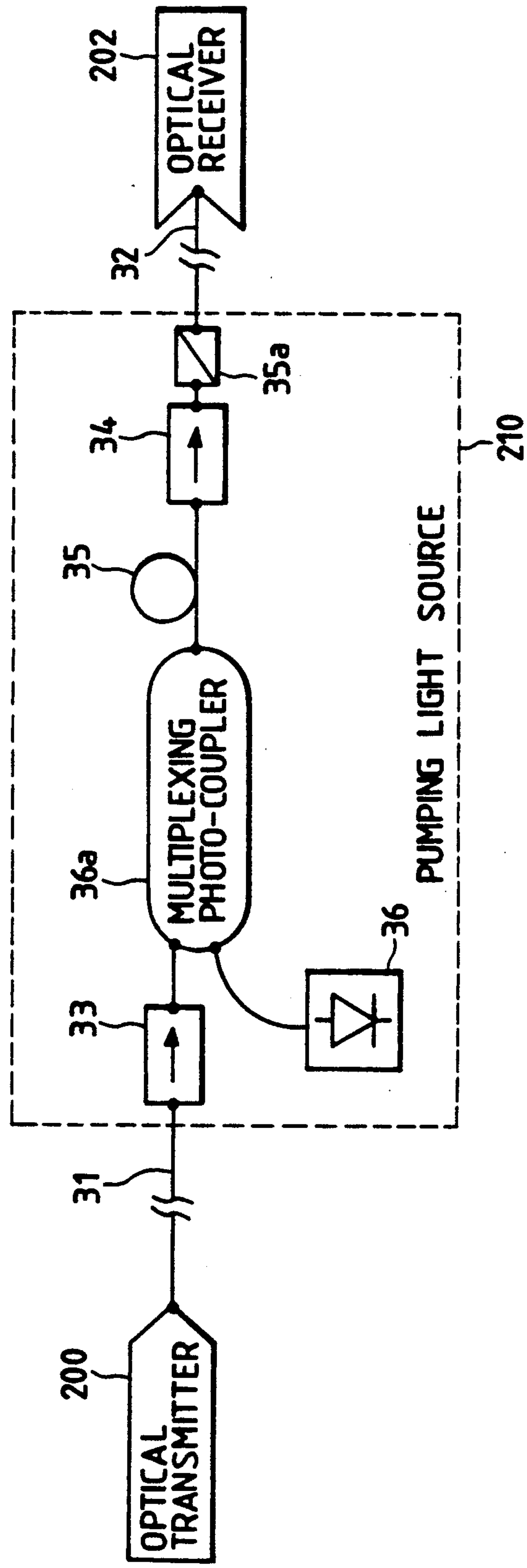
FIG. 4 (Prior Art) is a schematic diagram of the basic configuration of an optical fiber amplifier.
Figure 5:
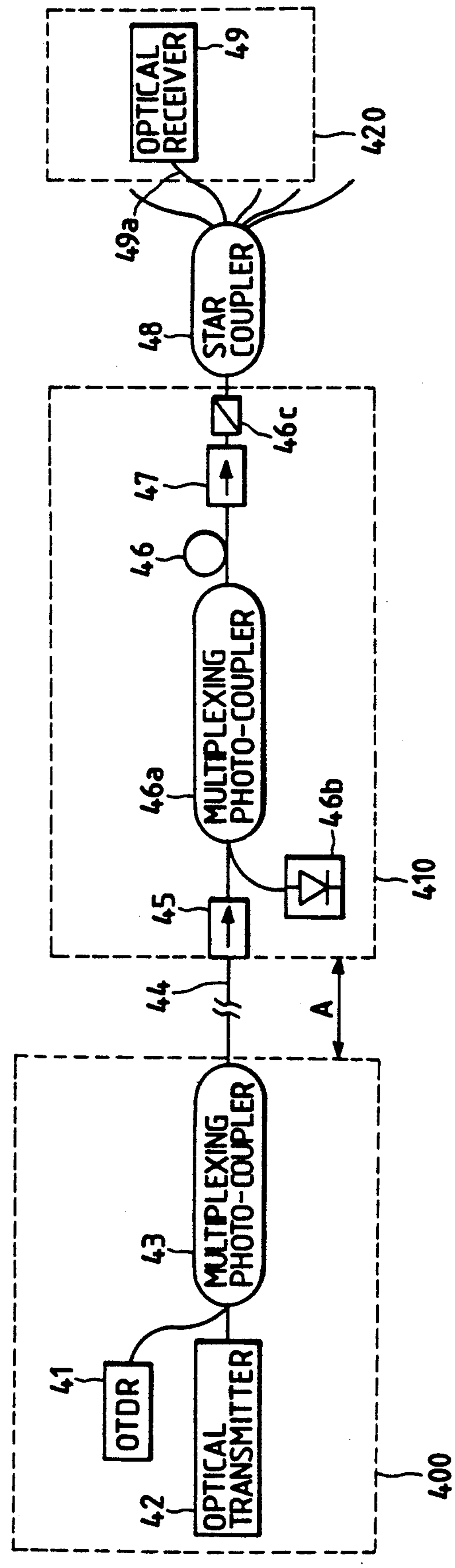
FIG. 5 (Prior Art) is a schematic diagram of the typical configuration of a conventional optical communication system arranged by use of an optical fiber transmission line including an optical fiber amplifier.

FIG. 3(*a*) is a schematic diagram of another embodiment of the optical communication system according to the present invention, which has the same basic configuration and system functions as the optical communication system shown in FIG. 1(*a*). Parts being the same as those in the optical communication system shown in FIG. 1(*a*) are referenced correspondingly.

This embodiment differs from the Embodiment in FIG. 1(*a*) such that trunk line optical fiber 5 is coupled to the by-pass optical fiber 8 by optical circulators 21 and 22. The first terminal of the bypass optical fiber 8 is coupled with the trunk line optical fiber 5 by the optical circulator 21 and not by a multiplexing photo-coupler (the multiplexing photocoupler 9 in the optical communication system shown in FIG. 1(*a*)). On the other hand, the second terminal of the by-pass optical fiber 8 is coupled with the trunk line optical fiber 5 by the optical circulator 22 and not by the star coupler 10.

FIG. 3(*b*) is a schematic diagram which explains the function of a optical circulator used as a multiplexing-/demultiplexing photo-coupler in the optical communication system of this embodiment.

An optical circulator 20 has three or more input/output ports X, Y and Z, and couples an optical signal injected from a certain port with a adjacent port on a certain side. That is, the following coupling is realized by this example.

port X→port Y port Y→port Z port Z→port X

Details of a optical circulator are described in Chapter 10, etc., of "Optical Integrated Circuit", edited by The Japan Society of Applied Physics/Optics Social Meeting, published by Asakura Shoten.

In the optical communication system using the optical circulators 21 and 22, a optical signal transmitted from the optical transmitter 3 of the center office 20 is coupled with only the optical fiber amplifier 7 by the optical circulator 21 and is not coupled with the by-pass optical fiber 8. On the other hand, a optical signal transmitted from the subscriber 30 or back scattering light is coupled with only the by-pass optical fiber 8 by the optical circulator 22 and is not transmitted to the optical fiber amplifier 7.

The present invention demonstrates that bi-directional optical signal transmission can be achieved in an optical transmission line which uses an optical fiber amplifier having optical isolators. In the present system it is also possible to monitor the conditions of all the optical signal lines by an OTDR and to transmit signals from the subscriber to the center office, so that maintenance and reliability of the optical communication system is improved.

Furthermore, the present invention can be applied not only to an optical communication system using an optical fiber amplifier but also to an optical communication system comprising, for example, a semiconductor laser amplifier including optical isolators.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An optical communication system comprising:

first optical fiber means for transmitting first optical signals in a first direction, said first optical fiber means comprising pieces, each of said pieces having first and second ends;

means, coupled to said second end of a first piece of said first optical fiber means and said first end of a second piece of said first optical fiber means, for amplifying said first optical signals being transmitted in said first direction;

second optical fiber means for transmitting second optical signals in a second direction, said second direction being substantially opposite to said first direction, said second optical fiber means having a first end coupled to said first piece of said first optical fiber means, and a second end coupled to said second piece of said of said first optical fiber means, said second optical fiber means bypassing said amplifying means;

means, coupled to said first end of said first piece of said first optical fiber means, for providing said first optical signals transmitted in said first direction to said first optical fiber means, said first optical signal providing means comprising means for monitoring conditions of said first optical fiber means and said second optical fiber means; and at least one means, coupled to said second end of said second piece of said first optical fiber means, for receiving said first optical signals transmitted in said first direction.

2. An optical communication system as in claim 1, wherein said amplifying means comprises:

an Er-added optical fiber;

a semiconductor laser for injecting pumping light into said Er-added optical fiber;

photocoupler means for coupling said semiconductor laser to said Er-added optical fiber; and dual optical isolators, each of said optical isolators being disposed at opposite ends of said amplifying means, one of said optical isolators being coupled to said photocoupler means and a second one of said optical isolators being coupled to said Er-added optical fiber.

3. An optical communication system as in claim 1, wherein said first optical signal providing means further comprises:

photocoupler means for coupling said first optical signal providing means to said first end of said first piece of said first optical fiber means;

second optical signal receiving means for receiving said second optical signals transmitted in said second direction;

first switching means for selectively coupling said monitoring means and said second optical signal receiving means to said second photocoupler; and first optical signal producing means, coupled to said second photocoupler means, for supplying said first optical signals to said first end of said first piece of said first optical fiber.

4. An optical communication system as in claim 2, wherein said first optical signal providing means further comprise:

second photocoupler means for coupling said first optical signal providing means to said first end of said first piece of said first optical fiber means;

second optical signal receiving means for receiving said second optical signals transmitted in said second direction;

first switching means for selectively coupling said monitoring means and said second optical signal receiving means to said second photocoupler means; and first optical signal producing means, coupled to said second photocoupler means, for supplying said first optical signals to said first end of said first piece of said first optical fiber means.

5. An optical communication system as in claim 1, further comprising:

photocoupler means for coupling said first piece of said first optical fiber means to said first end of said second optical fiber means; and second photocoupler means for coupling said second end of said second piece of said first optical fiber means to said at least one of said first optical signal receiving means.

6. An optical communication system as in claim 3, wherein said first optical signal providing means further comprises second switching means, coupled between said monitoring means and said first switching means, for selectively coupling said monitoring means to one of a plurality of connector ports.

7. An optical communication system as in claim 1, further comprising:

a first optical circulator for coupling said first end of said second optical fiber means to said first piece of said first optical fiber means, and a second optical circulator for coupling said second end of said second optical fiber means to said second piece of said first optical fiber means.

8. An optical communication system comprising:

first optical fiber means for transmitting first optical signals in a first direction, said first optical fiber means comprising pieces, each of said pieces having first and second ends;

means, coupled to said second end of a first piece of said first optical fiber means and said first end of a second piece of said first optical fiber means, for amplifying said first optical signals being transmitted in said first direction;

second optical fiber means for transmitting second optical signals in a second direction, said second direction being substantially opposite to said first direction, said second optical fiber means having a first end coupled to said first piece of said first optical fiber means, and a second end coupled to said second piece of said of said first optical fiber means, said second optical fiber means bypassing said amplifying means;

means, coupled to said first end of said first piece of said first optical fiber means, for providing said first optical signals transmitted in said first direction to said first optical fiber means, said first optical signal providing means comprising means for monitoring conditions of said first optical fiber means and said second optical fiber means;

at least one means, coupled to said second end of said second piece of said first optical fiber means, for receiving said first optical signals transmitted in said first direction; and optical fiber coupling means for coupling each of said first optical signal receiving means to said second end of said second piece of said first optical fiber means, each of said first optical signal receiving means comprising:

third optical signal receiving means comprising:

third optical signal receiving means for receiving said first optical signals transmitted in said first direction;

second means for providing, to said second optical fiber means, said second optical signals transmitted in said second direction; and photocoupler means for coupling said second receiving means and said second optical signal providing means to said optical fiber coupling means.

9. An optical communication system as in claim 8, wherein said amplifying means comprises:

an Er-added optical fiber;

a semiconductor laser for injecting pumping light into said Er-added optical fiber;

photocoupler means for coupling said semiconductor laser to said Er-added optical fiber; and dual optical isolators, each of said optical isolators being disposed at opposite ends of said amplifying means, one of said optical isolators being coupled to said photocoupler means and a second one of said optical isolators being coupled to said Er-added optical fiber.

10. An optical communication system as in claim 8, wherein said first optical signal providing means further comprises:

photocoupler means for coupling said first optical signal providing means to said first end of said first piece of said first optical fiber means;

second optical signal receiving means for receiving said second optical signals transmitted in said second direction;

first switching means for selectively coupling said monitoring means and said second optical signal receiving means to said second photocoupler; and first optical signal producing means, coupled to said second photocoupler means, for supplying said first optical signals to said first end of said first piece of said first optical fiber.

11. An optical communication system as in claim 9, wherein said first optical signal providing means further comprises:

second photocoupler means for coupling said first optical signal providing means to said first end of said first piece of said first optical fiber means;

second optical signal receiving means for receiving said second optical signals transmitted in said second direction;

first switching means for selectively coupling said monitoring means and said second optical signal receiving means to said second photocoupler means; and first optical signal producing means, coupled to said second photocoupler means, for supplying said first optical signals to said first end of said first piece of said first optical fiber means.

12. An optical communication system as in claim 8, further comprising:

photocoupler means for coupling said first piece of said first optical fiber means to said first end of said second optical fiber means; and second photocoupler means for coupling said second end of said second piece of said first optical fiber means to said at least one of said first optical signal receiving means.

13. An optical communication system as in claim 10, wherein said first optical signal providing means further comprises second switching means, coupled between said monitoring means and said first switching means, for selectively coupling said monitoring means to one of a plurality of connector ports.

14. An optical communication system as in claim 8, further comprising:

a first optical circulator for coupling said first end of said second optical fiber means to said first piece of said first optical fiber means; and a second optical circulator for coupling said second end of said second optical fiber means to said second piece of said first optical fiber means.

15. An optical communication system comprising:

first optical fiber means for transmitting first optical signals in a first direction, said first optical fiber means comprising pieces, each of said pieces having first and second ends;

means, coupled to said second end of a first piece of said first optical fiber means and said first end of a second piece of said first optical fiber means, for amplifying said first optical signals being transmitted in said first direction, said amplifying means comprising:

an Er-added optical fiber;

a semiconductor laser for injecting pumping light into said Er-added optical fiber;

photocoupler means for coupling said semiconductor laser to said Er-added optical fiber; and dual light isolators, each of said light isolators being disposed at opposite ends of said amplifying means, one of said light isolators being coupled to said photocoupler means and a second one of said light isolators being coupled to said Er-added optical fiber;

second optical fiber means for transmitting second optical signals in a second direction, said second direction being substantially opposite to said first direction, said second optical fiber means having a first end coupled to said first piece of said first optical fiber means, and a second end coupled to said second piece of said of said first optical fiber means, said second optical fiber means bypassing said amplifying means;

means, coupled to said first end of said first piece of said first optical fiber means, for providing said first optical signals transmitted in said first direction to said first optical fiber means, said first optical signal providing means comprising:

second photocoupler means for coupling said first optical signal providing means to said first end of said first piece of said first optical fiber means;

means for monitoring conditions of said first optical fiber means and said second optical fiber means;

second optical signal receiving means for receiving said second optical signals transmitted in said second direction;

first switching means for selectively coupling said monitoring means and said second optical signal receiving means to said second photocoupler means;

first optical signal producing means, coupled to said second photocoupler means, for supplying said first optical signals to said first end of said first piece of said first optical fiber means;

third optical fiber means, having first and second ends, for coupling said semiconductor laser to said Er-added optical fiber, said first end of said third optical fiber being coupled to said semiconductor laser and said second end of said third optical fiber being coupled to said Er-added optical fiber;

second means for monitoring conditions of said third optical fiber;

fourth optical signal receiving means for receiving optical signals amplified by said amplifying means and for monitoring operating conditions of said amplifying means in accordance with said amplified optical signals; and second switching means for selectively coupling said second monitoring means and said fourth optical signal receiving means to said first end of said third optical fiber;

and at least one first means, coupled to said second end of said second piece of said first optical fiber means, for receiving said first optical signals transmitted in said first direction.

* * * * *